March 13, 1951 W. E. HEUBACH 2,544,958
LAWN CULTIVATING MACHINE
Filed Oct. 1, 1946 3 Sheets-Sheet 2
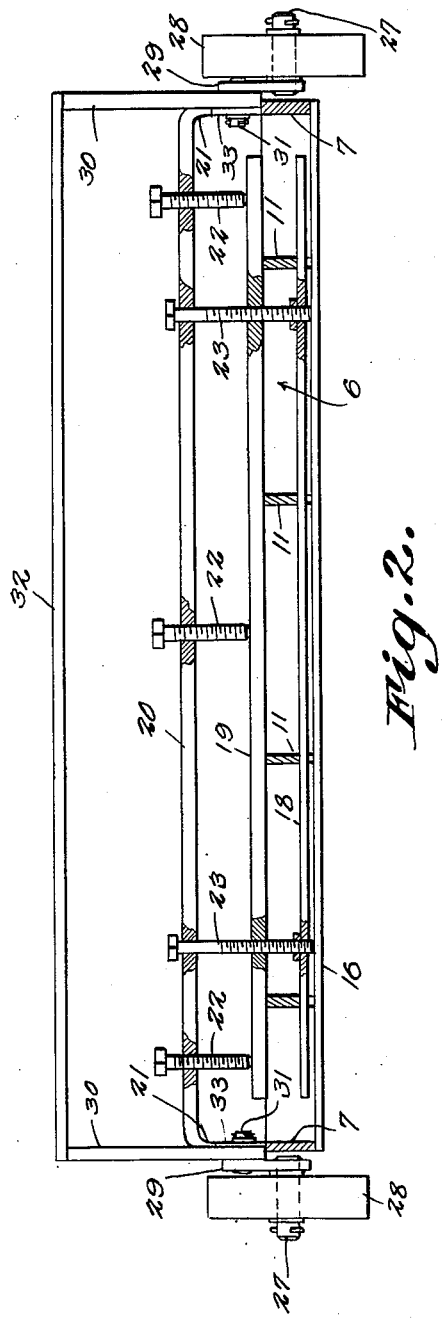
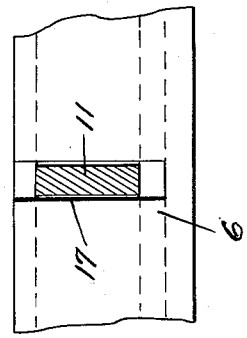
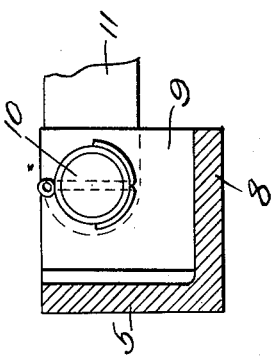
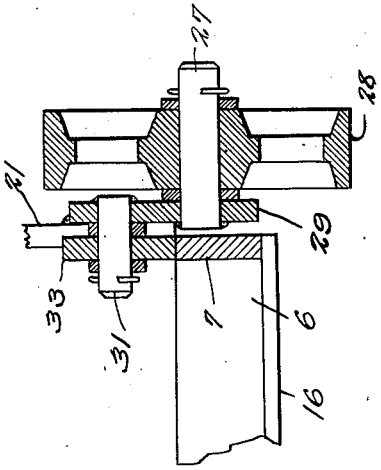
Inventor
W. E. Heubach
By Knowles
Attorneys.

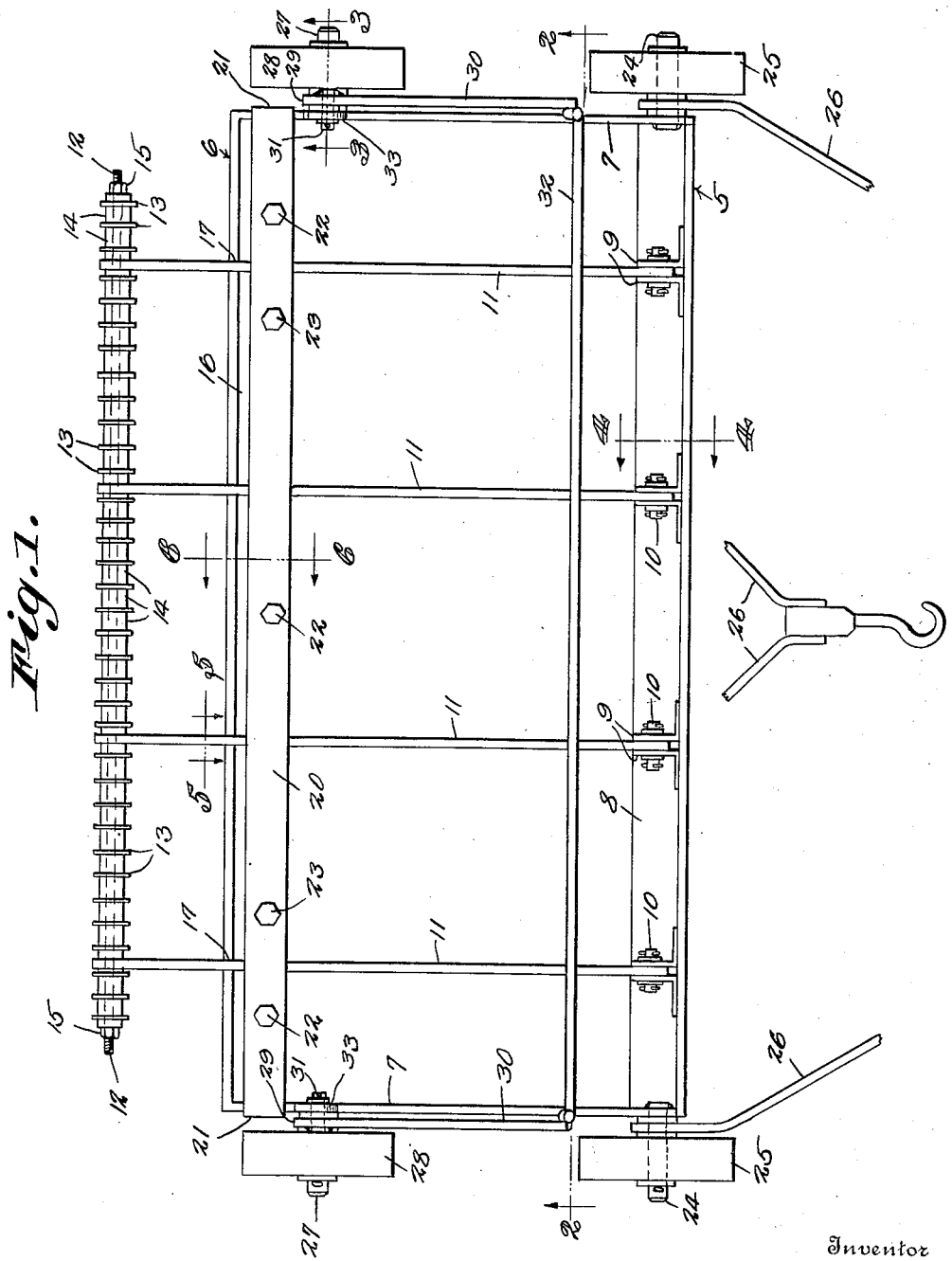

March 13, 1951 W. E. HEUBACH 2,544,958
LAWN CULTIVATING MACHINE
Filed Oct. 1, 1946 3 Sheets-Sheet 3
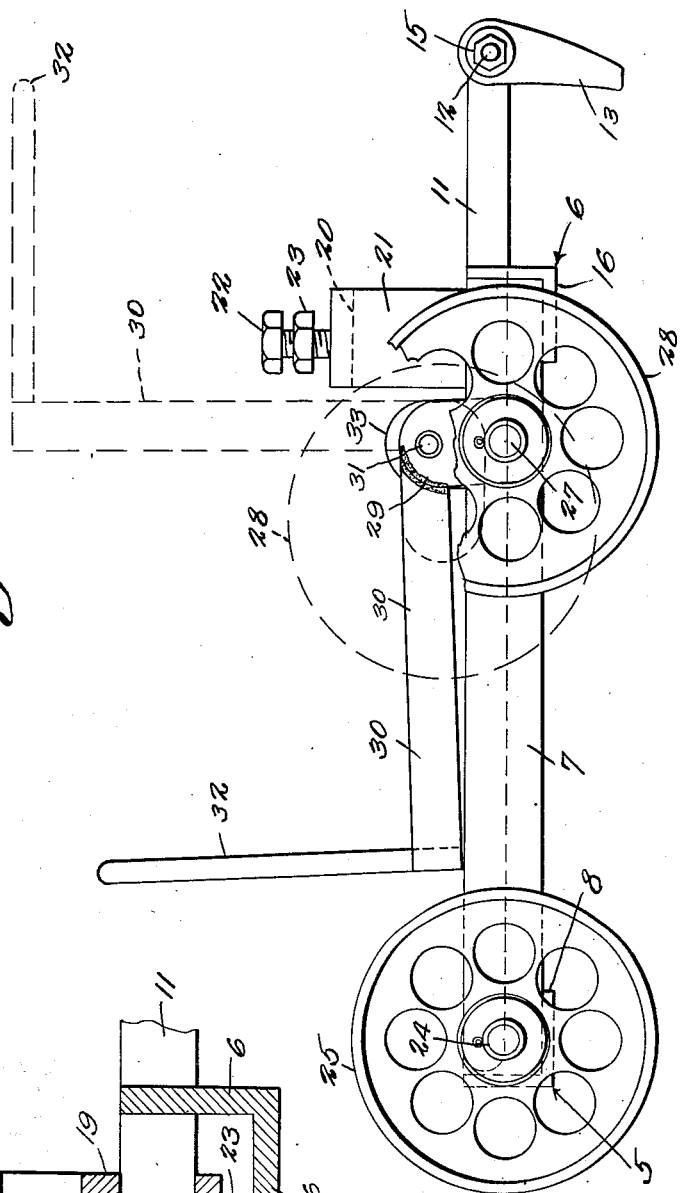
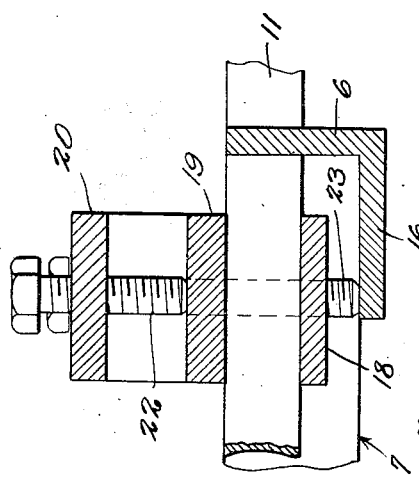
Inventor
W. E. Heubach
By C. A. Knowles
Attorneys.

Patented Mar. 13, 1951

2,544,958

UNITED STATES PATENT OFFICE 2,544,958

LAWN CULTIVATING MACHINE

William E. Heubach, Morton, Ill.

Application October 1, 1946, Serial No. 700,521

2 Claims. (Cl. 55—75)

This invention relates to an agricultural machine, and particularly to an agricultural machine designed primarily for the maintenance of greens of golf courses.

The primary object of the invention is to provide a machine of this character for raking out the dead grass and cutting grooves into the matted bed of roots of the grass forming the greens to provide openings to receive the fertilizer to allow the fertilizer to filtrate into the bottom of the root bed.

Another object of the invention is to provide an implement which may be operated by a small tractor to the end that the grooves cut by the implement are of a uniform depth and the lines or grooves are maintained straight, resulting in a smooth and velvety surface well aerated.

Still another object of the invention is to provide an implement including a plurality of spaced blades that cut into the surface, the blades being supported in such a way that adjustment of the blades to regulate the depth of operation, may be made.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a plan view of a device constructed in accordance with the invention Figure 2 is a sectional view taken on the line 2—2 of Figure 1.

Figure 3 is a sectional view taken on line 3—3 of Figure 1.

Figure 4 is a sectional view taken on line 4—4 of Figure 1.

Figure 5 is a sectional view on line 5—5 of Figure 1.

Figure 6 is a section on line 6—6 of Figure 1.

Figure 7 is a view in side elevation with parts broken away.

Referring to the drawings in detail, the frame of the machine comprises the front bar 5 and rear bar 6, the front and rear bars being connected by means of the end bars 7.

The front bar 5 is constructed of angle bar material and provides a bottom flange section 8 which provides a support for the pairs of spaced brackets 9 which are preferably welded to the bar 5.

The brackets 9 of each pair are connected by the pins 10 that provide securing means for the arms 11 for securing the arms 11 to the front bar, in such a way as to permit the bars 11 to move vertically with respect to the frame of the machine.

The arms 11 are of such lengths to extend appreciable distances beyond the rear bar 6 of the main frame, where they are provided with openings to receive the shaft 12 on which the blades 13 are mounted, the blades 13 being provided with openings to receive the shaft. Spacers 14 are disposed between the blades 13 to hold the blades in proper spaced relation with respect to each other, and provide means for securing the blades in position when the nuts 15 at the ends of the shaft 12 are tightened on the threaded ends of the shaft.

The rear bar 6 is also formed of angle bar material and includes a lower longitudinal flange 16, the upstanding flange of the bar 6, being formed with slots 17 through which the arms 11 extend, so that the arms 11 may move vertically with respect to the rear bar 6. The arms 11 are secured between the transverse bars 18 and 19, which clamp the arms so that movement of the transverse bars 18 and 19, will act to adjust the arms 11 simultaneously, regulating the vertical position of the blades 13.

Another transverse bar 20 is provided above the bar 19, the bar 20 being provided with outwardly extended ends 21 secured to the upper edges of the end bars 7. Bolts 22 are threaded in openings of the bar 20 and have their inner ends resting on the bar 19, while the bolts 23 extend through openings in the bars 19 and 20 and have their inner ends threaded in openings formed in the bar 18. Thus it will be seen that due to this construction, the bolts 23 may operate to raise or lower the bars 18 and 19 and arms 11 connected therewith. The bolts 22 are operated to prevent accidental movement of the arms 11, and bars 18 and 19, after an adjustment has been made. At the front of the frame, are stub axles 24 on which the front wheels 25 are mounted draw bars 26 being connected with the axles whereby the device may be hooked to a tractor.

At the rear of the frame are stub axles 27 on which the wheels 28 are mounted, the stub axles 27 being secured to the ends of the arms 29, while the upper ends of the arms 29 are secured to the arms 30, the arms 29 and 30 being formed with openings to receive the bolt 31, on which the arms 29 and 30 operate. The bolts 31 operate within the bearings 33 secured to the end bars 7 of the frame.

Connecting the arms 30 is a bar 32, which has right-angled ends secured to the arms 30. Thus it will be seen that by moving the bar 32, the supporting wheels 28 may be moved into and out of operation. When the wheels 28 are moved out of operation the weight of the machine is supported on the blades 13 to move the blades 13 into the surface to cut the ground surface as the machine is moved thereover.

From the foregoing it will be seen that due to the construction shown and described, I have provided a gang of cutting blades which are carried by a shaft to cut the ground surface and provide grooves or openings to aerate the roots of the grass and admit fertilizer to the roots.

It will also be seen that because of the adjustable feature of applicant's invention, the depth of operation of the blades may be regulated to meet various requirements.

Having thus described the invention, what is claimed is:

1. A ground conditioning machine comprising a wheel supported frame including a front bar, arms mounted on the front bar for vertical pivotal movement, a rear bar including a vertical flange and a horizontal flange, said vertical flange having vertical slots, the outer ends of the arms being disposed in the slots and extending beyond the rear bar of the frame, a shaft connecting the free ends of the arms, a plurality of vertical cutting blades mounted on the shaft and adapted to cut into the ground surface over which the machine is moved, means for adjusting the normal operating positions of the arms and blades, said adjusting means embodying an upper stationary bar having bolt openings, a transversely extended lower movable bar and intermediate movable bar under the upper stationary bar between which the arms are held said intermediate bar having threaded openings, adjusting bolts extending through the bolt openings of the upper bar and threaded openings of the intermediate movable bar, said bolts resting on said horizontal flange, adjusting bolts extending through the upper stationary bar engaging the intermediate movable bar, whereby rotation of the bolts raises and lowers the movable bars and arms with respect to the surface over which the machine is moved.

2. A machine of the class described comprising a wheel supported frame including a front bar, arms mounted on the front bar for vertical pivotal movement, a rear bar including a vertical flange and a horizontal flange, said vertical flange having vertical slots, the arms being disposed in the slots and extending beyond the rear bar of the frame, a shaft extending through openings in the free ends of the arms, a plurality of vertical cutting blades mounted on the shaft and adapted to cut into the ground surface over which the machine is moving, means for adjusting the normal operating positions of the arms and blades, said adjusting means embodying an upper stationary bar, a lower movable transverse bar and an intermediate bar, said arms being held between said movable bar and intermediate bar, adjusting bolts extending through the stationary bar and movable bars, the inner ends of the bolts resting on the horizontal flange, whereby rotation of the bolts raises and lowers the movable bars, and bolts extending through the stationary bar engaging the intermediate bar securing said movable bars in their positions of adjustment.

WILLIAM E. HEUBACH.

REFERENCES CITED

The following references are of record in the file of this patent:

UNITED STATES PATENTS

| Number | Name | Date |
| --- | --- | --- |
| 55,093 | Hammond | May 29, 1866 |
| 131,996 | Brunner | Oct. 8, 1872 |
| 1,034,364 | Hanson | July 30, 1912 |